United States Patent
Forte

(10) Patent No.: US 11,423,388 B2
(45) Date of Patent: *Aug. 23, 2022

(54) OUT-OF-BAND DEVICE VERIFICATION OF TRANSACTIONS

(71) Applicant: AT&T Intellectual Property I, L.P., Atlanta, GA (US)

(72) Inventor: Andrea Forte, Brooklyn, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 245 days.

This patent is subject to a terminal disclaimer.

(21) Appl. No.: 16/693,679

(22) Filed: Nov. 25, 2019

(65) Prior Publication Data

US 2020/0090159 A1    Mar. 19, 2020

Related U.S. Application Data

(63) Continuation of application No. 14/091,846, filed on Nov. 27, 2013, now Pat. No. 10,489,772.

(51) Int. Cl.
*G06Q 20/32* (2012.01)
*G06Q 20/42* (2012.01)
(Continued)

(52) U.S. Cl.
CPC ......... *G06Q 20/325* (2013.01); *G06Q 20/085* (2013.01); *G06Q 20/12* (2013.01);
(Continued)

(58) Field of Classification Search
CPC .............. G06Q 20/325; G06Q 20/401; H04L 63/1416; H04L 63/1408
See application file for complete search history.

(56) References Cited

U.S. PATENT DOCUMENTS

| 4,405,829 A | 9/1983 | Rivest et al. |
| 4,805,222 A | 2/1989 | Young et al. |

(Continued)

FOREIGN PATENT DOCUMENTS

| CN | 101833619 | 9/2010 |
| GB | 2104698 | 3/1983 |

(Continued)

OTHER PUBLICATIONS

"Rule-Based Publish-Subscribe Mechanism for Real-time Applications"; Xin Li; Zhiping Jia; Xinjie Lu; Haiyang Wang; 2009 Eighth IEEE/ACIS International Conference on Computer and Information Science, pp. 689-694. (Year: 2009).*

(Continued)

*Primary Examiner* — John W Hayes
*Assistant Examiner* — Edgar R Martinez-Hernandez
(74) *Attorney, Agent, or Firm* — Hartman & Citrin LLC

(57) ABSTRACT

Concepts and technologies are disclosed herein for out-of-band device verification of transactions. A processor can execute a verification service. The verification service can receive a verification request with data relating to a transaction between a computing device and an application. The verification service can identify an out-of-band device associated with the computing device and obtain verification data from the out-of-band device. The verification service can compare the verification data to data relating to the transaction to determine if the transaction is to be verified. Based upon the determination, the verification service can approve or block the transaction.

20 Claims, 8 Drawing Sheets

(51) Int. Cl.
G06Q 20/12 (2012.01)
G06Q 20/08 (2012.01)
G06Q 20/40 (2012.01)

(52) U.S. Cl.
CPC ....... *G06Q 20/3224* (2013.01); *G06Q 20/405* (2013.01); *G06Q 20/4016* (2013.01); *G06Q 20/425* (2013.01)

(56) References Cited

U.S. PATENT DOCUMENTS

| | | | |
|---|---|---|---|
| 5,557,686 | A | 9/1996 | Brown et al. |
| 6,056,193 | A | 5/2000 | McAuliffe et al. |
| 6,442,692 | B1 | 8/2002 | Zilberman |
| 6,968,462 | B2 | 11/2005 | Challener et al. |
| 7,092,926 | B2 | 8/2006 | Cerrato |
| 7,280,981 | B2 * | 10/2007 | Huang ............ G06Q 20/02 705/40 |
| 7,606,560 | B2 * | 10/2009 | Labrou ............ H04W 12/069 455/411 |
| 7,774,595 | B2 | 8/2010 | Chung Geon et al. |
| 7,802,103 | B2 | 9/2010 | Bender et al. |
| 7,917,750 | B2 | 3/2011 | Novoa et al. |
| 8,051,468 | B2 * | 11/2011 | Davis ............ G06F 21/316 726/5 |
| 8,099,253 | B1 | 1/2012 | Rau |
| 8,150,772 | B2 * | 4/2012 | Mardikar ............ H04L 63/0823 705/64 |
| 8,245,044 | B2 * | 8/2012 | Kang ............ G06Q 20/42 713/176 |
| 8,327,459 | B2 * | 12/2012 | Aoki ............ G06F 21/31 726/28 |
| 8,346,672 | B1 * | 1/2013 | Weiner ............ G06Q 20/425 705/64 |
| 8,355,988 | B2 * | 1/2013 | Powell ............ G06Q 20/32 705/64 |
| 8,548,858 | B2 * | 10/2013 | May ............ G06Q 40/12 705/18 |
| 8,549,629 | B1 * | 10/2013 | McCreesh ............ G06F 21/316 726/22 |
| 9,203,982 | B2 * | 12/2015 | Yokoyama ............ G07G 1/0018 |
| 9,240,011 | B2 * | 1/2016 | Fuerstenberg ............ G06F 21/44 |
| 10,489,772 | B2 * | 11/2019 | Forte ............ G06Q 20/405 |
| 2005/0008148 | A1 | 1/2005 | Jacobson |
| 2005/0223234 | A1 * | 10/2005 | McOwan ............ G06K 9/00154 713/186 |
| 2006/0090067 | A1 * | 4/2006 | Edmonds ............ H04L 67/104 713/159 |
| 2006/0282660 | A1 * | 12/2006 | Varghese ............ G06Q 20/4016 713/155 |
| 2008/0011825 | A1 * | 1/2008 | Giordano ............ G06Q 20/32 235/380 |
| 2010/0302157 | A1 | 12/2010 | Zilberman |
| 2012/0084843 | A1 | 4/2012 | Hernoud et al. |
| 2012/0143770 | A1 * | 6/2012 | Pauker ............ G06F 21/6263 705/71 |
| 2012/0174233 | A1 | 7/2012 | Waterson |
| 2013/0212637 | A1 | 8/2013 | Guccione et al. |
| 2013/0226800 | A1 * | 8/2013 | Patel ............ G06Q 20/3224 705/44 |
| 2015/0073992 | A1 * | 3/2015 | Weiner ............ G06Q 20/40 705/44 |

FOREIGN PATENT DOCUMENTS

| | | |
|---|---|---|
| GB | 2470579 | 12/2010 |
| WO | WO 97/23816 | 7/1997 |
| WO | WO 2006047164 | 8/2007 |

OTHER PUBLICATIONS

"User Authentication Using Combination of Behavioral Biometrics over the Touchpad Acting Like Touch Screen of Mobile Device"; Hataichanok Saevanee; Pattarasinee Bhatarakosol; 2008 International Conference on Computer and Electrical Engineering, pp. 82-86. (Year: 2008).*

Portokalidis et al., "Paranoid Android: Zero-Day Protection for Smartphones Using the Cloud," Proceedings of the 26th Annual Computer Security Applications Conference, ACM, 2010.

Dandachi et al., "A Novel Identification/Verification Model Using Smartphone's Sensors and User Behavior," ICABME13, Sep. 11, 2013.

Shi et al., "SenGuard: Passive User Identification on Smartphones Using Multiple Sensors," 2011 IEEE 7th International Conference on Wireless and Mobile Computing, Networking and Communications (WiMob).

Buchoux et al., "Deployment of Keystroke Analysis on a Smartphone," Proceedings of the 6th Australian Information Security Management Conference, Edith Cowan University, Dec. 1, 2006, Perth, Western Australia.

Trojahn et al., "Toward Mobile Authentication with Keystroke Dynamics on Mobile Phones and Tablets," retrieved at https://cse.cs.ovgu.de/cse/administrator/components/com_jresearch/files/publications/Trojahn_2013.pdf on Nov. 4, 2013.

Nauman et al., "TOKEN: Trustable Keystroke-Based Authentication for Web-Based Applications on Smartphones," ISA 2010, CCIS 76, pp. 286-297, 2010, Springer-Verlag Berlin Heidelberg.

"Secure E-Payment Protocol with New Involved Entities;" Mildrey Carbonell, Joaquin Torres, Diego Suarez, Jose M. Sierra; (Year: 2008).

U.S. Office Action dated Jul. 28, 2016 in U.S. Appl. No. 14/091,846.
U.S. Office Action dated Mar. 7, 2017 in U.S. Appl. No. 14/091,846.
U.S. Office Action dated Nov. 28, 2017 in U.S. Appl. No. 14/091,846.
U.S. Office Action dated Jul. 18, 2018 in U.S. Appl. No. 14/091,846.
U.S. Notice of Allowance dated Jul. 1, 2019 in U.S. Appl. No. 14/091,846.

* cited by examiner

OUT-OF-BAND DEVICE VERIFICATION OF TRANSACTIONS

CROSS-REFERENCE TO RELATED APPLICATIONS

This application is a continuation of and claims priority to U.S. patent application Ser. No. 14/091,846, entitled "Out-of-Band Device Verification of Transactions," filed Nov. 27, 2013, now U.S. Pat. No. 10,489,772, which is incorporated herein by reference in its entirety.

BACKGROUND

Networking devices, processing capabilities, and memory devices have become cheaper and more commonplace over the past several years. Because these devices have become more readily available, an increasing number of devices have been equipped with networking capabilities and/or Internet access. For example, some refrigerators can be configured to inform users when particular items are finished, out of date, or the like. Similarly, automobiles may be configured to support certain types of network connections and/or communicate with other devices for various purposes.

Malware attacks are sometimes used to exploit network or Internet connectivity to access computing devices such as computers. Malware can be used to interfere with transactions occurring via network connections. For example, man-in-the middle attacks are one type of malware attack in which an attacker intercepts communications between a first device and a second device, and makes changes to the communications for various reasons.

In one example of a man-in-the-middle attack, an attacker may pose as a banking customer and/or intercept communications between the banking customer and a banking system. By modifying input and/or output between the banking customer and the banking system, the attacker may be able to transfer funds into an account associated with the attacker or elsewhere.

SUMMARY

The present disclosure is directed to out-of-band device verification of transactions. A computing device can access a web server or other device to access an application hosted by the device to perform or request execution of a transaction. The web server can be configured to verify the transaction requested or executed by the computing device. The verification can be performed for some transactions or for all transactions, based upon options, subscriptions, triggers, account settings, determined risks, combinations thereof, or the like. The web server can generate a request to verify the transaction, for example a verification request, and transmit the request to a verification service. The verification service can correspond to an application, module, or service hosted by a server computer or other computing system.

The verification service can verify the transaction using out-of-band communications with devices and/or device components associated with the computing device or other devices involved in or associated with a transaction being verified. In some embodiments, the verification service can generate a verification data request and transmit the verification data request to an out-of-band device. The verification data request can specify data and/or information requested from the out-of-band device. As such, the verification data request can request battery status and/or usage information, display status and/or usage information, input devices status and/or usage information, sensor status information such as orientation of the device, movement of the device, combinations thereof, or the like.

The out-of-band device can receive the verification data request and, in response to the verification data request, obtain or generate verification data that is responsive to the verification data request. The out-of-band device can provide the verification data to the verification service. In some embodiments, the out-of-band device can receive the verification data request from the verification service and/or can provide the verification data to the verification service via an out-of-band communication channel. The verification service can compare the verification data with transaction data and/or other data obtained with or as part of the verification request. Based upon the comparison, the verification service can determine if the transaction for which verification is requested is authorized, authentic, verified, or the like. The verification service can alternatively determine, based upon the comparison, that the transaction is not authentic, unauthorized, unverified, or the like.

The verification service can generate a verification response to be provided to the web server based upon the comparison. The verification response can indicate to the web server if the transaction is verified or not. Thus, the verification response can indicate that the transaction is authorized or authentic, unauthorized or fraudulent, or the like. In some embodiments, the verification response also can indicate an action to be taken, for example, if the transaction is to be terminated or allowed by the web server, if a user of the computing device is or is not to be notified regarding the allowing or blocking of the transaction, combinations thereof, or the like. These and other aspects of the concepts and technologies described herein will be illustrated and described in more detail below.

According to one aspect of the concepts and technologies disclosed herein, a method is disclosed. The method can include receiving, at a processor executing a verification service, a verification request with data relating to a transaction between a computing device and an application. The verification request can request that the processor verify the transaction. The method also can include identifying an out-of-band device associated with the computing device, request verification data from the out-of-band device, receive the verification data from the out-of-band device, and compare the verification data to the data relating to the transaction to determine if the transaction is to be verified. If a determination is made that the transaction is to be verified, the transaction can be approved. If a determination is made that the transaction is not to be verified, the transaction can be blocked.

In some embodiments, the out-of-band device can include an input device associated with the computing device, and determining that the transaction is not to be verified can include determining that the input device did not receive input corresponding to the transaction. In some embodiments, the out-of-band device can include an output device associated with the computing device, and determining that the transaction is not to be verified can include determining that the output device is not in use. In some embodiments, the out-of-band device can include a sensor associated with the computing device, and determining that the transaction is not be verified can include determining that the computing device is not in use.

In some embodiments, requesting the verification data can include generating a verification data request that requests the verification data from the out-of-band device, and transmitting the verification data request to the out-of-band device. In some embodiments, the verification request can be received from a web server via a first communication channel. The out-of-band device can include a component of a computing device involved in the transaction, and the processor can communicate with the out-of-band device via a second communication channel. In some embodiments, the verification request can be received via a communication channel, and the out-of-band communication device can communicate with the processor via an out-of-band communication channel.

In some embodiments, the computing device can include a smartphone. The smartphone can include a touchscreen. The out-of-band device can include the touchscreen, and the verification data can include input received by the computing device via the touchscreen. Determining that the transaction is not to be verified can include determining that the input does not correspond to the transaction. In some embodiments, the method can include generating, by the processor, an instruction to notify the computing device that the transaction has been blocked in response to the determination that the transaction is not to be verified.

According to another aspect of the concepts and technologies disclosed herein, a system is disclosed. The system can include a processor and a memory. The memory can store computer-executable instructions that, when executed by the processor, cause the processor to perform operations. The operations can include receiving a verification request with data relating to a transaction between a computing device and an application. The verification request can include a request to verify the transaction. The operations also can include identifying an out-of-band device associated with the computing device, requesting verification data from the out-of-band device, receiving the verification data from the out-of-band device, and comparing the verification data to the data relating to the transaction to determine if the transaction is to be verified. If a determination is made that the transaction is to be verified, the operations can include approving the transaction. If a determination is made that the transaction is not to be verified, the operations can include blocking the transaction.

In some embodiments, the out-of-band device can include a component of the computing device. The system also can include a web server, and the application can include a server application executed by the web server. In some embodiments, the system can include a network. The network can include a first communication channel and a second communication channel. The transaction can occur via communications over the first communication channel, and communications with the out-of-band device can occur via the second communication channel. In some embodiments, requesting the verification data can include generating a verification data request that requests the verification data from the out-of-band device, and transmitting the verification data request to the out-of-band device. In some embodiments, the out-of-band device can include a touchscreen associated with the computing device, the verification data can include input received by the computing device via the touchscreen, and determining that the transaction is not to be verified can include determining that the input does not correspond to the transaction.

According to yet another aspect, a computer storage medium is disclosed. The computer storage medium can have computer-executable instructions stored that, when executed by a processor, cause the processor to perform operations. The operations can include receiving a verification request with data relating to a transaction between a computing device and an application. The verification request can include a request to verify the transaction. The operations also can include identifying an out-of-band device associated with the computing device, requesting verification data from the out-of-band device, receiving the verification data from the out-of-band device, and comparing the verification data to the data relating to the transaction to determine if the transaction is to be verified. If a determination is made that the transaction is to be verified, the operations can include approving the transaction. If a determination is made that the transaction is not to be verified, the operations can include blocking the transaction.

In some embodiments, requesting the verification data can include generating a verification data request that requests the verification data from the out-of-band device, and transmitting the verification data request to the out-of-band device. In some embodiments, the out-of-band device can include an input device associated with the computing device, the verification data can include input received by the computing device via the input device, and determining that the transaction is not to be verified can include determining that the input does not correspond to the transaction. In some embodiments, the computing device can communicate with the application via a first communication channel, and the out-of-band device can communicate via a second communication channel.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
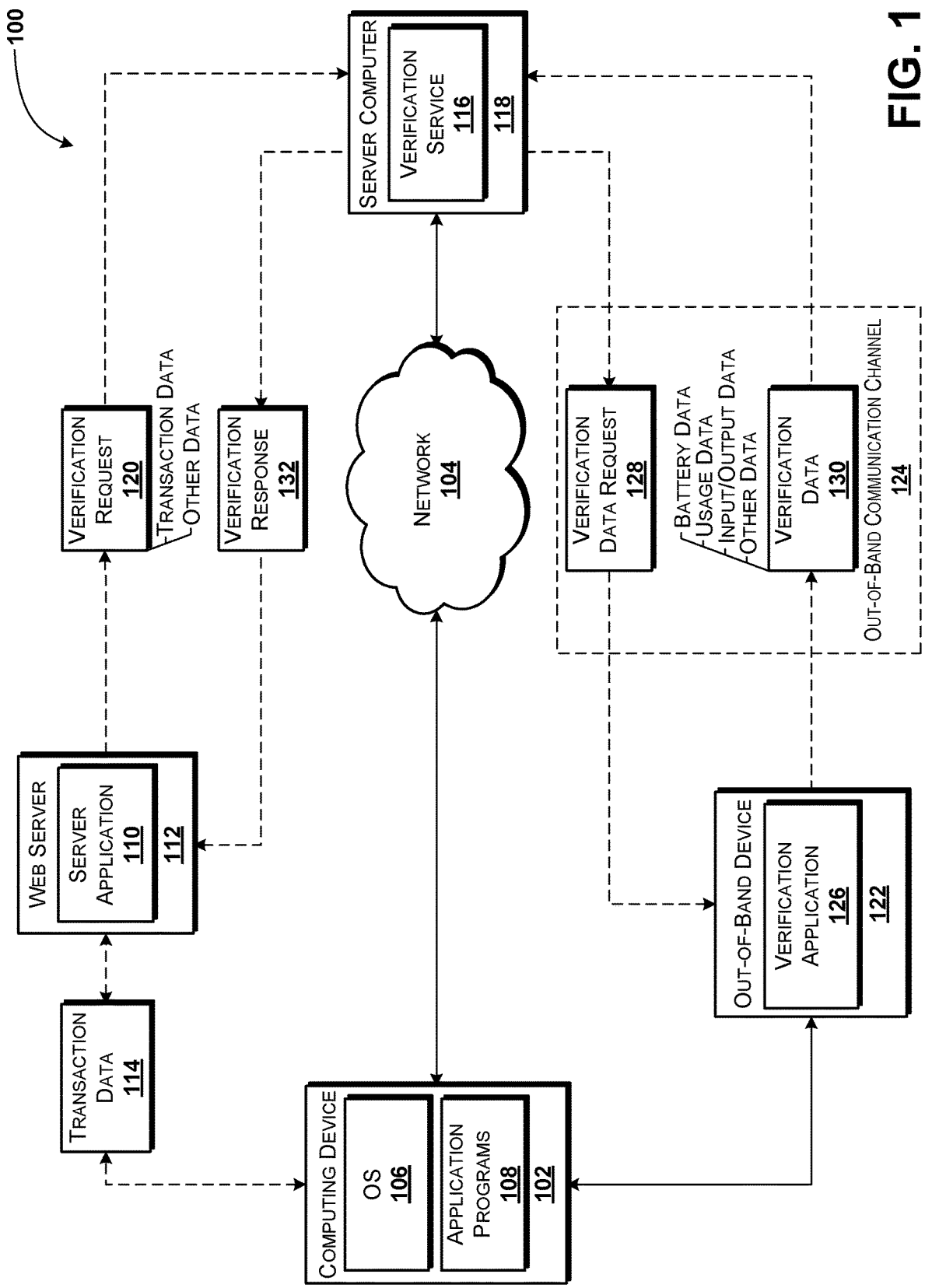
FIG. 1 is a system diagram illustrating an illustrative operating environment for the various embodiments disclosed herein.

The following detailed description is directed to out-of-band device verification of transactions. A computing device can interact with an application to perform a transaction. In some embodiments, the application can be hosted or executed by a web server or other device. The web server can be configured to request verification of the transaction requested or executed by the computing device. The web server can generate a request to verify the transaction, for example a verification request, and transmit the request to a verification service executed and/or hosted by a computing device such as a server computer.

The verification service can access one or more out-of-band devices and/or device components associated with the computing device or other devices involved in or associated with a transaction being verified. In some embodiments, the verification service can generate a verification data request and transmit the verification data request to an out-of-band device. The verification data request can specify data and/or information requested from the out-of-band device. As such, the verification data request can request sensor readings, location device readings, battery status and/or usage information, display status and/or usage information, input devices status and/or usage information, combinations thereof, or the like. The out-of-band device can receive the verification data request and, in response to the verification data request, obtain or generate verification data that is responsive to the verification data request. The out-of-band device can provide the verification data to the verification service. In some embodiments, the out-of-band device can receive the verification data request from the verification service and/or can provide the verification data to the verification service via an out-of-band communication channel.

The verification service can compare the verification data with transaction data and/or other data obtained with or as part of the verification request. Based upon the comparison, the verification service can determine if the transaction for which verification is requested is authorized, authentic, verified, not authentic, unauthorized, unverified, or the like. The verification service can generate a verification response that can indicate to the web server if the transaction is verified or not. In some embodiments, the verification response also can indicate an action to be taken, for example, if the transaction is to be terminated or allowed by the web server, if a user of the computing device is or is not to be notified regarding the allowing or blocking of the transaction, combinations thereof, or the like. These and other aspects of the concepts and technologies described herein will be illustrated and described in more detail below.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for out-of-band device verification of transactions will be described, according to an illustrative embodiment. The operating environment 100 shown in FIG. 1 includes a computing device 102. The computing device 102 can operate in communication with and/or as a part of a communications network ("network") 104, though this is not necessarily the case. In particular, some embodiments, of the concepts and technologies described herein can be embodied by devices in communication via direct links, via private or public networks, via components of one device that is not in communication with other devices, and/or by one or more devices or device components in communication with one another via other functionality and/or devices. As such, the illustrated embodiment should be understood as being illustrative and should not be construed as being limiting in any way.

According to various embodiments of the concepts and technologies described herein, the functionality of the computing device 102 may be provided by one or more server computers, one or more desktop computers, one or more mobile telephones, one or more laptop computers, one or more tablet or slate computing devices, one or more set-top boxes ("STBs") or set-top units ("STUs"), one or more gateway devices, other computing systems, combinations thereof, or the like. The functionality of the computing device 102 can be provided by a single device, by two similar devices, and/or by two or more dissimilar devices. For purposes of describing the concepts and technologies disclosed herein, the computing device 102 is described herein as a consumer computing device such as a PC, a laptop, a smartphone, or the like. Because various embodiments of the concepts and technologies described herein can be used in association with other types of computing devices, it should be understood that this embodiment is illustrative, and should not be construed as being limiting in any way.

The computing device 102 can execute an operating system 106 and one or more application programs 108. The operating system 106 can include a computer program for controlling the operation of the computing device 102. The application programs 108 can include executable programs configured to execute on top of the operating system 106 to provide various functions associated with the computing device 102. For example, the application programs 108 can include web browsers, native applications, web applications, media playback programs, productivity software, utility software, combinations thereof, or the like. To illustrate some embodiments of the concepts and technologies described herein, one embodiment of the application programs 108 that includes a web browser is described herein for purposes of illustration. Because the application programs 108 can include almost any kind of natively executed and/or web-based applications, the described embodiments should be understood as being illustrative and should not be construed as being limiting in any way.

The computing device 102 can be used to perform a transaction. For example, the computing device 102 can execute the application programs 108, for example a web browser, and the application programs 108 can be used to perform transactions. In one contemplated embodiment, a web browser or other application program 108 can be executed by the computing device 102 to access a server application 110 executed and/or hosted by a web server 112 or other computing device. Via interactions with the server application 110, the computing device 102 can perform a transaction.

The web server 112 can be associated with various entities. According to various embodiments of the concepts and technologies described herein, the web server 112 can be associated with a bank or other financial institution, a mail server, a remote storage facility, a virtual network, combinations thereof, or the like. The server application 110 can include server-side and/or client-based executable code and/or a hybrid thereof. For example, the server application 110 can include code for rendering a web page and/or codes or scripts for executing or otherwise providing web application functionality. Thus, the server application 110 can include executable code, markup language code such as HTML, XML, or the like, and/or scripts such as JAVA script, AJAX, .ASP, .ASPNET, or the like. Because the transaction described herein can be executed and/or provided by various entities and/or by various combinations of code and/or scripts, it should be understood that this example is illustrative and therefore should not be construed as being limiting in any way.

As shown in FIG. 1, the computing device 102 and the web server 112 can exchange transaction data 114. The transaction data 114 can include executable code, scripts, image files, audio files, video files, and/or other code that is to be rendered and/or interacted with by the various devices to allow execution of the transaction. The transaction data 114 also can include data received from the computing device 102 such as, for example, keystrokes; voice commands; mouse movements; screen swipes, taps, or other gesture inputs; other input; combinations thereof; or the like. Thus, the transaction data 114 can collectively represent a transaction occurring between the web server 112 and the computing device 102.

In some types of malware attacks, malware can infect a device such as the computing device 102, and cause the computing device 102 to execute transactions without user input. Similarly, in some attacks such as man-in-the middle attacks, or the like, devices or malware between the computing device 102 and the web server 112 can alter the transaction data 114 in either or both directions, namely, the malware or device can alter the transaction data 114 presented to the computing device 102 and/or can alter the transaction data 114 provided to the web server 112. As such, the transaction data 114 may represent an authorized transaction and associated output and input, or the transaction data 114 may represent an unauthorized transaction.

Thus, some embodiments of the concepts and technologies described herein provide systems and methods for verifying that the transaction occurring between the computing device 102 and the web server 112, as well as transactions occurring between other devices or systems, are authorized by verifying the transaction data 114. In particular, an entity or entities associated with a web server 112 and/or the computing device 102 may register or otherwise elect to perform transaction verification as described herein. The verification of transactions can be completed for liability purposes, as a value-added service for customers, and/or for other reasons. Regardless of the motivation for supporting transaction verification, the web server 112 and/or other devices can communicate with a verification service 116 to obtain verification of transactions.

The verification service 116 can include an application hosted or executed by a computing device such as a server computer 118. In some embodiments of the concepts and technologies described herein, the verification service 116 can be operated as a callable service or other application that is hosted by a real or virtual computing device. In the illustrated embodiment, the verification service 116 is a callable service that can be hosted by a server computer 118. It should be understood that this example is illustrative and therefore should not be construed as being limiting in any way.

The verification service 116 can be accessed by various entities to verify transactions. In one embodiment of the concepts and technologies described herein, the verification service 116 can receive a verification request 120 from the web server 112. It should be understood that the transmission of the verification request 120 to the verification service 116 can be prompted by the server application 110 based upon various considerations such as a computed risk associated with a transaction, a configuration setting associated with the server application 110, a user preference or setting associated with a computing device 102 involved in a transaction, an account setting, other considerations, combinations thereof, or the like.

The server application 110 can generate the verification request 120 and transmit the verification request 120 to the verification service 116. The verification request 120 can be used to call or request functionality associated with the verification service 116. In some embodiments, the server application 110 can generate the verification request 120 with, among other things, the transaction data 114, a portion of the transaction data 114, a representation of the transaction data 114, or a representation of a portion of the transaction data 114; user and/or device identifiers associated with a transaction that is being verified; geographic location data of one or more users or devices associated with the transaction; passwords, user IDs, and/or other authentication information; security levels and/or risk level indicators; other information and/or data; combinations thereof; or the like.

In some other embodiments, the server application 110 can include these and/or other data with the verification request 120. Thus, while the transaction data and the other data are shown as part of the verification request 120, it should be understood that these and/or other information can be submitted with, but not necessarily a part of, the verification request 120. Thus, the illustrated embodiment should be understood as being illustrative of one contemplated embodiment and therefore should not be construed as being limiting in any way.

It therefore can be appreciated that in addition to the verification request 120 requesting verification of a transaction, the verification request 120 can provide information that can be used by the verification service 116 to verify the transaction. Thus, some embodiments of the concepts and technologies described herein can allow the server application 110 to transmit the verification request 120 and require no further communication with the server application 110 prior to providing a response to the verification request 120, thereby minimizing communications between the web server 112 and the server computer 118. It should be understood that this example is illustrative and therefore should not be construed as being limiting in any way.

According to various embodiments of the concepts and technologies described herein, the verification service 116 can be configured to communicate with one or more out-of-band devices 122 as part of verification of the transaction. As used herein, the phrase "out-of-band" can be used to refer to communications between the verification service 116 and the out-of-band devices 122. In particular, the verification service 116 can be configured to communicate with the out-of-band devices 122 via a communication channel that is not directly involved with the transaction that is being verified by the verification service 116. While the out-of-band devices 122 may or may not be involved in the transaction being verified, the verification service 116 can communicate with the out-of-band devices 122 via a communication channel that is not being used as part of the transaction.

Thus, a communication channel between the out-of-band devices 122 and the verification service 116 can be referred to herein as an out-of-band communication channel 124, as shown in FIG. 1. It should be understood that the out-of-band devices 122 may be involved in the transaction being verified or may not be involved in the transaction being verified. Thus, the "out-of-band" phrase used herein is with reference to the communication with these devices and not necessarily the devices themselves. These and other aspects of the out-of-band devices 122 are described in additional detail hereinbelow.

According to various embodiments of the concepts and technologies described herein, the out-of-band devices 122 can include various devices and/or device components. The devices and/or device components can be configured to execute a verification application 126 and/or other application programs that can be configured to communicate with the verification service 116 via the out-of-band communication channel 124 and/or other communication channels. In some embodiments, the functionality of the out-of-band devices 122 can be provided by input and/or output devices, computing devices, combinations thereof, or the like. In particular, some embodiments of the out-of-band devices 122 can include mice or other pointer devices such as joysticks, rollerballs, touch pads, or the like; touchscreens, touchpads, or other touch input devices; displays, projectors, speakers, or other output devices; microphones, cameras, or other input devices; memories or other data storage devices; processors; location determination devices; computers; other devices or device components; combinations thereof; or the like.

The out-of-band devices 122 can be configured for network and/or Internet connectivity and can communicate with the verification service 116 via the out-of-band communication channel 124. The out-of-band devices 122 can be configured via execution of computer-executable instructions such as the verification application 126 to receive a verification data request 128 from the verification service 116, to generate or obtain verification data 130 that is responsive to the verification data request 128, and to provide the verification data 130 to the verification service 116.

The verification data 130 generated by the verification application 126 can include various types of information and/or data that can be used by the verification service 116 to determine if the transaction being verified is legitimate. The contents of the verification data 130 can vary based upon a type of device or a type of device component associated with the out-of-band device 122. For example, if the out-of-band device 122 includes a keyboard, the verification data 130 can represent keystrokes or other input data. In another example, if the out-of-band device 122 includes a mouse or other pointing device, the verification data 130 can represent movements of the pointer or cursor, as well as clicks, drag-and-drops, or the like associated with the pointing device. In yet another example, if the out-of-band device 122 includes a touch screen, the verification data 130 can represent if the display is displaying data, if any input is occurring in association with the display, a representation of the input, if any, combinations thereof, or the like.

In another example, if the out-of-band device 122 includes a computer or other computing device, the verification data 130 can indicate if the computing device 102 is active, in a proximity of the computer, in communication with the computer, combinations thereof, or the like. In yet another example, if the out-of-band device 122 includes a microphone or other input device, the verification data 130 can indicate if the input actually is occurring or occurred. In still another example, if the out-of-band device 122 includes a sensor or sensors, the verification data 130 can indicate a geographic location, an orientation, and/or a movement of the computing device 102. In these and other embodiments of the out-of-band device 122, the verification data 130 can include battery data indicating a power state and/or usage associated with the out-of-band device 122; usage data indicating a usage and/or state of the out-of-band device 122; input/output data representing interactions with and/or input collected by the out-of-band device 122; and/or other information or data such as location information, ambient sound or light levels, network communication information, combinations thereof, or the like.

The out-of-band device 122 can identify, collect, and package the verification data 130 and transmit the verification data 130 to the verification service 116. In various embodiments, the out-of-band device 122 can transmit the verification data 130 to the verification service 116 via the out-of-band communication channel 124, though this is not necessarily the case. Thus, the verification data 130 can be transmitted by the out-of-band device 122 as a response to the verification data request 128, if desired. In some other embodiments, the verification service 116 can access and/or "pull" the verification data 130 from the out-of-band device 122, if desired. Because the verification data 130 can be provided to or obtained by the verification service 116 in additional and/or alternative manners, it should be understood that these examples are illustrative and therefore should not be construed as being limiting in any way.

The verification service 116 can compare the verification data 130 to transaction data and/or other data included in the verification request 120 received or otherwise obtained from the server application 110. As noted above, the verification request 120 can include or can be accompanied by data or other information representing keystrokes, mouse movements, mouse clicks, touch inputs, voice inputs, and/or other input or data associated with a transaction and/or represented by the transaction data 114. The verification data 130 can represent these and/or other information from the perspective of the out-of-band device 122. Thus, the verification service 116 can, by comparing the transaction data and/or other data included in or with the verification request 120, determine if the transaction is to be verified or not verified.

In one example, the transaction being verified can correspond to a financial transaction such as a balance transfer between two accounts. The transaction data 114 exchanged by the web server 112 and the computing device 102 can represent a balance transfer screen and an indication of amounts, dates, accounts associated the transfer, and/or other aspects of the balance transfer. Thus, the verification request 120 can include and/or can be submitted with a representation of the amounts, dates, accounts, and/or the like.

In this example, the verification data 130 can represent, among other things, an operating state of a display associated with the computing device 102 and/or data displayed by the display; an operating state of a keyboard or touchscreen associated with the computing device 102 and/or keystrokes or taps or touches entered at or using the keyboard or touchscreen; other data; or the like. Thus, the verification data 130 can indicate, among other things, if the transaction data 114 is actually being displayed by a display associated with the computing device 102, if amounts, accounts, and/or dates associated with the balance transfer have actually been entered via the keyboard or touchscreen associated with the computing device 102, or the like. By comparing the verification data 130 and the transaction data or other data included in or with the verification request 120, the verification service 116 can determine if the transaction is authentic or not.

The verification service 116 can be configured to generate a verification response 132. The verification response 132 can indicate if the transaction is determined to be authentic. The verification response 132 also can indicate an action to be taken, if any, in response to the determination of whether or not the transaction is authentic and/or authorized. For example, the verification response 132 can indicate that the transaction is valid or authorized. In some embodiments, the verification response 132 can instruct the server application 110 to terminate the transaction or allow the transaction. In some embodiments, the verification response 132 can indicate that a notification is to be provided to the computing device 102, where the notification can indicate that a transaction has been blocked and/or can provide instructions. One example of a notification that can be provided to the computing device 102 is illustrated and described in FIG. 5. These and other aspects of the concepts and technologies described herein are described in more detail below, particularly with reference to FIGS. 2-5.

In practice, a device such as the computing device 102 can access a web server 112 to perform a transaction. The web server 112 can be configured to verify the transaction each time a transaction is performed or for some transactions. For example, transactions can be verified based upon triggers, settings, configurations, account options, or the like associated with the computing device 102 and/or the transaction and/or based upon other considerations. The web server 112 can generate a request to verify the transaction, for example the verification request 120 shown in FIG. 1, and transmit the request to the server computer 118.

The server computer 118 can, via execution of the verification service 116, verify the transaction using out-of-band communications with devices and/or device components associated with the computing device 102 or other devices involved in a transaction being verified. In some embodiments, the verification service 116 can generate a verification data request 128 and transmit the verification data request 128 to an out-of-band device 122. The verification data request 128 can specify data and/or information requested from the out-of-band device 122. As such, the verification data request 128 can request battery status and/or usage information, display status and/or usage information, input devices status and/or usage information, sensor status information such as orientation of the device, movement of the device, or the like; combinations thereof, or the like.

The out-of-band device 122 can receive the verification data request 128 and, in response to the verification data request 128, obtain or generate verification data 130 that is responsive to the verification data request 128. The out-of-band device 122 can provide the verification data 130 to the server computer 118. In some embodiments, the out-of-band device 122 receives the verification data request 128 from the server computer 118 and/or provides the verification data 130 to the server computer 118 via an out-of-band communication channel 124.

The server computer 118 can compare the verification data 130 with transaction data and/or other data obtained with or in the verification request 120. Based upon the comparison, the server computer 118 can determine if the transaction for which verification is requested is authorized or authentic. The server computer 118 can alternatively determine, based upon the comparison, that the transaction is not authentic, unauthorized, or the like.

The server computer 118 can generate a verification response 132 to be provided to the web server 112 based upon the comparison. The verification response 132 can indicate, to the web server 112, if the transaction is verified or not. Thus, the verification response 132 can indicate that the transaction is authorized or authentic, unauthorized or fraudulent, or the like. The verification response 132 also can indicate an action to be taken, for example, if the transaction is to be terminated or allowed by the web server 112, if a user of the computing device 102 is or is not to be notified regarding the allowing or blocking of the transaction, combinations thereof, or the like. These and other aspects of the concepts and technologies described herein will be illustrated and described in more detail below.

FIG. 1 illustrates one computing device 102, one network 104, one server computer 118, and one out-of-band device 122. It should be understood, however, that various implementations of the operating environment 100 include zero, one, or more than one computing device 102, zero, one, or more than one network 104, zero, one, or more than one server computer 118, and/or zero, one, or more than one out-of-band device 122. As such, the illustrated embodiment should be understood as being illustrative, and should not be construed as being limiting in any way.

Figure 2:
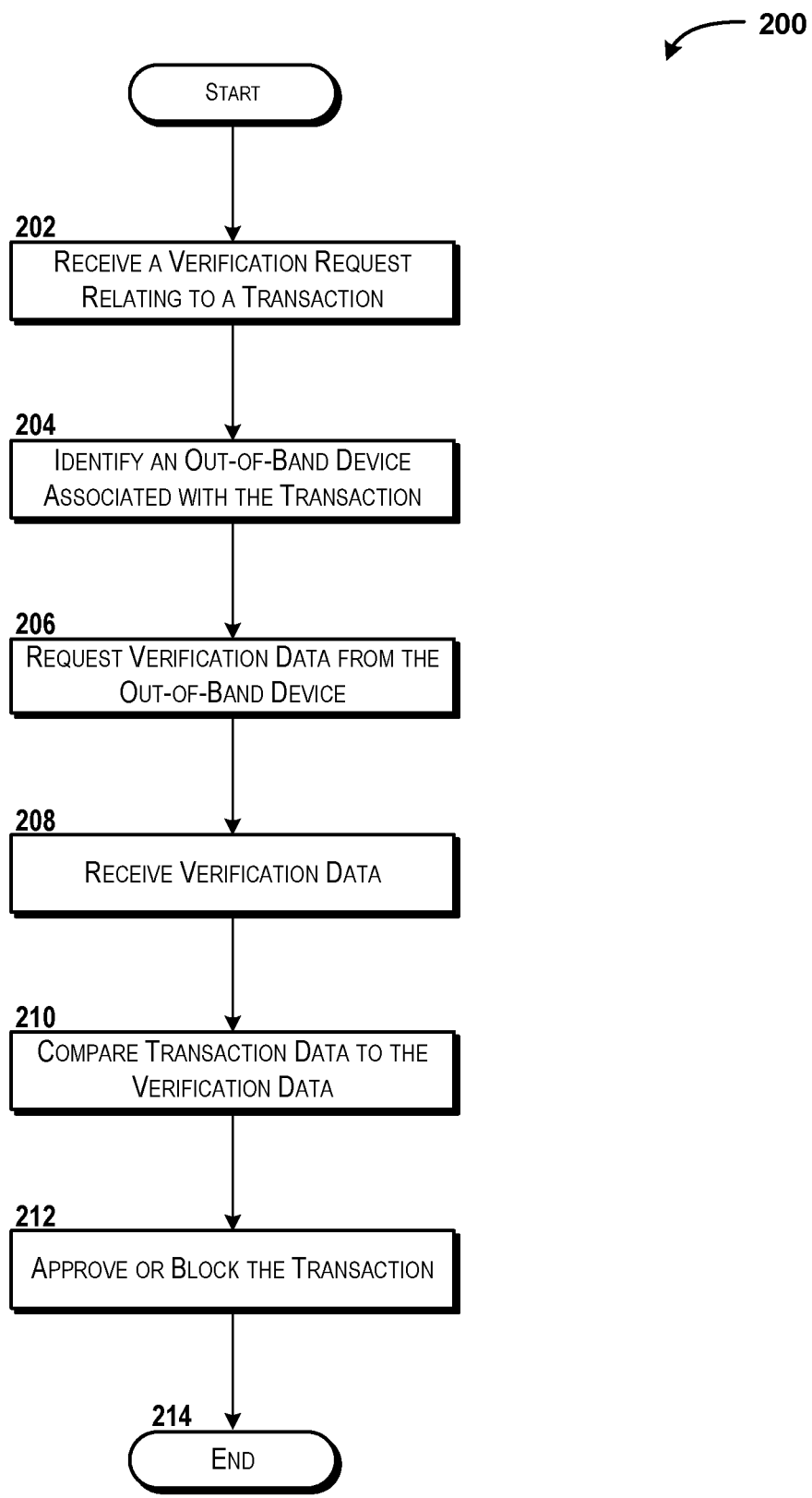
FIG. 2 is a flow diagram showing aspects of a method for verifying a transaction using an out-of-band device, according to an illustrative embodiment.

Turning now to FIG. 2, aspects of a method 200 for verifying a transaction using an out-of-band device 122 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, for example, the computing device 102, the web server 112, the server computer 118, and/or the out-of-band device 122 to perform one or more operations and/or causing the processor to direct other components of the computing system or device to perform one or more of the operations.

For purposes of illustrating and describing the concepts of the present disclosure, the methods disclosed herein are described as being performed by the server computer 118, the web server 112, or the out-of-band device 122 via execution of one or more software modules such as, for example, the server application 110, the verification service 116, and/or the verification application 126. It should be understood that additional and/or alternative devices and/or network nodes can provide the functionality described herein via execution of one or more modules, applications, and/or other software including, but not limited to, the server application 110, the verification service 116, and/or the verification application 126. Thus, the illustrated embodiments are illustrative, and should not be viewed as being limiting in any way.

The method 200 begins at operation 202. At operation 202, the server computer 118 can receive a verification request 120 relating to a transaction. In some embodiments, the server computer 118 can receive the verification request 120 from a device such as the web server 112, which can be configured to execute various actions and/or transactions. According to various embodiments, the web server 112 can execute a server application 110 that can interact with various devices such as the computing device 102 to provide application functionality. In one contemplated example, the computing device 102 can exchange transaction data 114 with the web server 112 to execute a financial transaction. Thus, the server application 110 can correspond to a banking application or other financial application, as well as other applications, scripts, and/or code. It should be understood that this example is illustrative and therefore should not be construed as being limiting in any way.

According to various embodiments, the verification request 120 received in operation 202 can include or can be transmitted with a representation of the transaction that is being verified. Thus, the verification request 120 can be transmitted with and/or can include the transaction data 114 or a portion or representation of the transaction data 114; user or device identifiers; location and/or time information; transaction particulars such as amounts, rates, or the like; combinations thereof; or the like. These and/or other information can be submitted with or as a part of the verification request 120 that is received in operation 202.

If these data are not submitted with or as a part of the verification request 120, or for other reasons, the server computer 118 can communicate with the web server 112 to obtain these and/or other information, if desired. Further communications are not described herein because some embodiments of the concepts and technologies described herein omit further communications to reduce resource usage between the server computer 118 and the web server 112. It should be understood that this example is illustrative and therefore should not be construed as being limiting in any way.

From operation 202, the method 200 proceeds to operation 204. At operation 204, the server computer 118 can identify an out-of-band device 122 associated with the transaction. In some embodiments, the out-of-band device 122 can include a device or a device component associated with the computing device 102. In some other embodiments, the out-of-band device 122 can correspond to a device or device component that is not part of the computing device 102, but may be associated with the computing device 102. For example, the out-of-band device 122 identified in operation 204 can include a keyboard, mouse, monitor, touchscreen, orientation or location sensor, or other device associated with a computer or device such as, for example, the computing device 102. The out-of-band device also can include a computing system, gateway, network switch or router, location beacon, or other device in communication with and/or in a proximity of the computing device 102 and/or other devices. It should be understood that these examples are illustrative and therefore should not be construed as being limiting in any way.

According to various embodiments of the concepts and technologies described herein, out-of-band devices such as the out-of-band device 122 identified in operation 204 can be registered with the verification service 116 and associated with users, accounts, transactions, devices, or the like. Thus, the server computer 118 can identify the out-of-band device 122 by identifying a user, device, account, transaction, or the like associated with a transaction being verified. As such, operation 204 can correspond to a lookup operation or the like in a database or other data structure that can associate out-of-band devices with a user, account, device, or the like. It should be understood that this example is illustrative and therefore should not be construed as being limiting in any way.

From operation 204, the method 200 proceeds to operation 206. At operation 206, the server computer 118 can request verification data 130 from the out-of-band device 122 identified in operation 204. According to various embodiments, the server computer 118 can generate a verification data request 128 and transmit the verification data request 128 to the out-of-band device 122 identified in operation 204.

The verification data request 128 can indicate data or a type of data that is being requested. The verification data request 128 also can specify data formats or the like, if desired. The server computer 118 can transmit the verification data request 128 to the out-of-band device 122 via an out-of-band communication channel 124 and/or other communication channels, if desired. As explained above, the out-of-band communication channel 124 can include a communication channel between the server computer 118 and the out-of-band device 122, and may not be used by the web server 112 and/or the computing device 102 for any communications relating to the transaction being verified. It should be understood that this example is illustrative and therefore should not be construed as being limiting in any way.

From operation 206, the method 200 proceeds to operation 208. At operation 208, the server computer 118 can receive the verification data 130 requested in operation 206. According to various embodiments, the server computer 118 can receive the verification data 130 via the out-of-band communication channel 124. The verification data 130 can include the data requested by way of the verification data request 128 generated and/or transmitted in operation 206. The verification data 130 therefore can include, for example, information indicating a battery state and/or usage indicator; information indicating a display state and/or usage indicator; information indicating an input device state and/or usage indicator; information indicating keystrokes, voice commands, and/or other input received by the out-of-band device 122; information indicating a geographic location, orientation, and/or movements associated with the computing device 102; combinations thereof; or the like.

From operation 208, the method 200 proceeds to operation 210. At operation 210, the server computer 118 can compare the verification data 130 and/or a portion or portions of the verification data 130 to data included in or with the verification request 120 received in operation 202 and/or other data or information associated with the transaction being verified. Thus, it can be appreciated that the server computer 118 can compare, in operation 210, the verification data 130 and/or components thereof with a representation of the transaction data 114. It should be understood that this example is illustrative and therefore should not be construed as being limiting in any way.

The comparison can be based upon various rules and/or analysis operations. In some embodiments, the server computer 118 can identify users, amounts, and/or other information included in the verification request and can determine keystrokes or other input that are associated with these information. The server computer 118 can compare the determined input with the verification data 130 to determine if the transaction is to be verified. If, for example, the transaction data 114 indicates that a purchase of a product is to be shipped to an address not associated with a user of the device involved in the transaction, the server computer 118 can determine if the address entered by way of keystrokes represented by the verification data 130 correspond to the address. As such, the server computer 118 can determine if input associated with the transaction being verified actually occurred. It should be understood that this example is illustrative and therefore should not be construed as being limiting in any way.

From operation 210, the method 200 proceeds to operation 212. At operation 212, the server computer 118 can approve or block the transaction. Based upon the comparison described above with regard to operation 210 and/or other comparisons of the verification data 130 and the verification request 120, the server computer 118 can determine that the transaction is authorized, that the transaction is unauthorized, that the transaction is legitimate or authentic, that the transaction is illegitimate or fraudulent, combinations thereof, or the like. Based upon these and/or other determinations, the server computer 118 can determine if the transaction is to be approved, allowed, or validated, or authenticated, or if the transaction is to be denied, terminated, blocked, or otherwise invalidated.

The server computer 118 can issue commands to one or more devices, systems, or the like to enforce a decision by the server computer 118. Thus, for example, the server computer 118 can issue commands to devices, systems, or network elements to filter or block traffic, to allow traffic, to block or allow transactions, or the like. The server computer 118 also can generate commands for pushing notifications to the computing device 102 or other devices. The notifications can inform a user or other entity associated with the computing device 102 that traffic or a transaction has been blocked or allowed, or the like. The notification can be provided as part of or with the verification response 132 or separately, and can be provided as a text message, an email, a push notification, a user interface, a phone call, or the like. It should be understood that these examples are illustrative and therefore should not be construed as being limiting in any way.

From operation 212, the method 200 proceeds to operation 214. The method 200 ends at operation 214.

Figure 3:
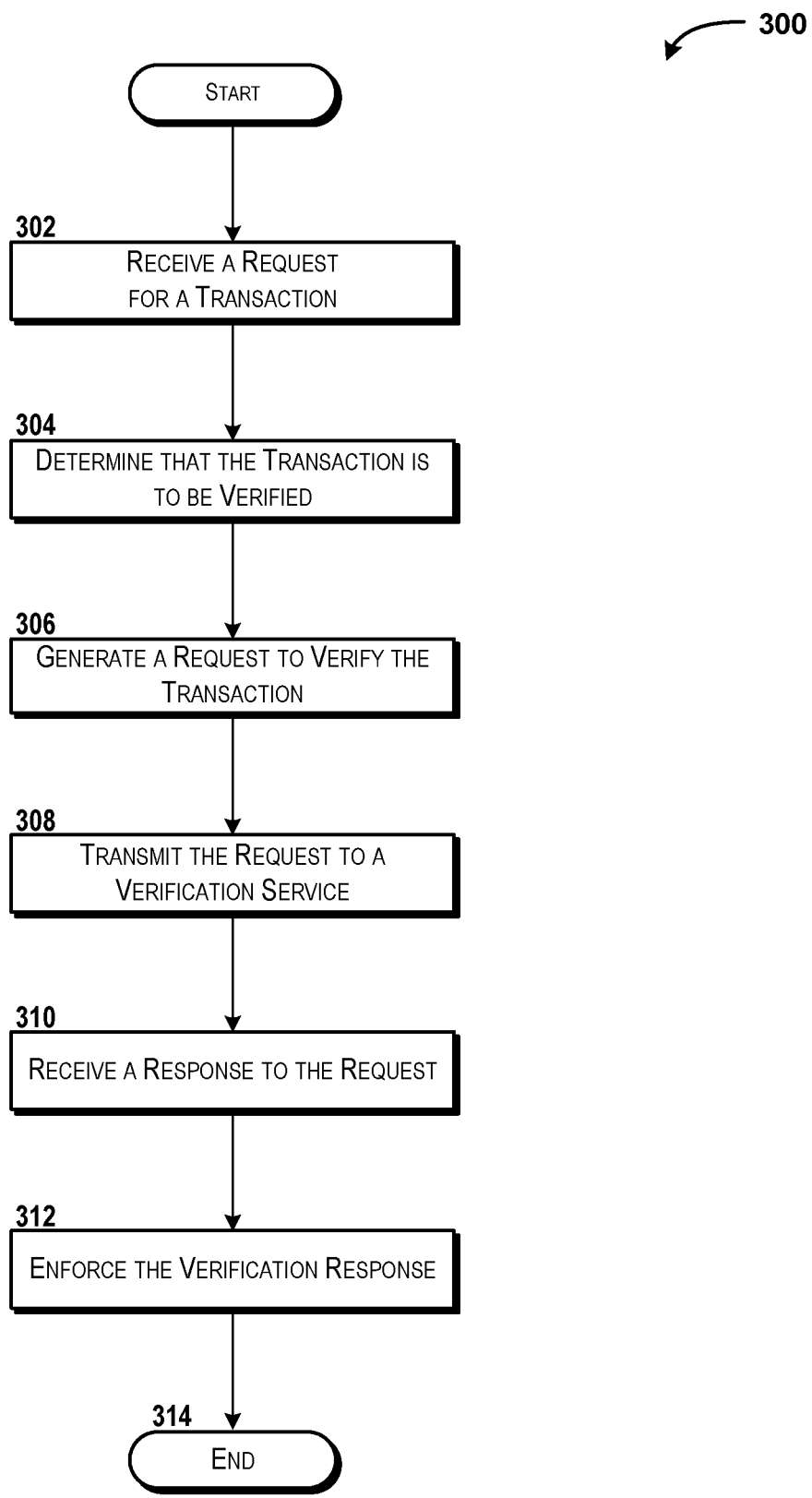
FIG. 3 is a flow diagram showing aspects of a method for verifying a transaction using a verification service, according to an illustrative embodiment.

Turning now to FIG. 3, aspects of a method 300 for verifying a transaction using a verification service will be described in detail, according to an illustrative embodiment. The method 300 begins at operation 302. At operation 302, the web server 112 can receive a request for a transaction. The request for the transaction can include, for example, a request to load a web page, a request to execute an action, a request to access functionality, a request to access a file, a request to initiate a file or data transfer, a request to authenticate with the web server 112, combinations thereof, or the like.

In some embodiments, the request received in operation 302 can correspond to submission of data for a transaction. For example, operation 302 can correspond to a POST or GET action prompted by submission of a form, execution of script, and/or other interactions with content by the computing device 102. It can be appreciated that because some web applications can be provided by execution of code at a client and/or a server, the request for the transaction received in operation 302 can be detected based upon execution of code and/or as a request that is not based upon execution of the code.

From operation 302, the method 300 proceeds to operation 304. At operation 304, the web server 112 can determine that the transaction associated with the request received in operation 302 is to be verified. As explained above, the web server 112 can determine that a transaction is to be verified based upon various considerations. For example, the web server 112 can be configured via configurations, settings, options, or software code to request verification for certain types of transactions; for transactions that exceed or do not meet defined thresholds; for transactions at certain times, intervals, or frequencies; or the like. The web server 112 also can be configured to verify all transactions; all transactions of a certain type; all transactions associated with a particular user, device, or location; combinations thereof; or the like. Because the web server 112 can determine that transactions are to be verified in a variety of ways, some of which have been explained in additional detail above, it should be understood that these examples are illustrative and therefore should not be construed as being limiting in any way.

From operation 304, the method 300 proceeds to operation 306. At operation 306, the web server 112 can generate a request to verify the transaction. In some embodiments, the request can include the verification request 120 illustrated and described herein. The request can include and/or can be sent with information that represents the transaction data 114 and other data. Thus, the request generated in operation 306 can include the transaction data 114 or a portion of the transaction data 114; a representation of the transaction data 114 or a representation of a portion of the transaction data 114; information defining a location of the computing device 102 or other device or user associated with the transaction being verified; a userID, password, or other authentication information; a device or user identifier such as an international mobile subscriber identity ("IMSI"), an international mobile equipment identity ("IMEI"), an account number, a device serial number, a user name, or the like; transaction particulars such as amounts, times, dates, parties, or the like; combinations thereof; or the like.

From operation 306, the method 300 proceeds to operation 308. At operation 308, the web server 112 can transmit the request generated in operation 306 to the verification service 116. In some embodiments, the web server 112 can transmit the request generated in operation 306 with data or other information relating to the transaction being verified, as explained herein. In some other embodiments, the web server 112 can transmit the request alone, wherein the request can include the data describing aspects of the transaction as explained above. In some other embodiments, the web server 112 can transmit the request to the server computer 118, and the server computer 118 can request the information relating to aspects of the transaction. Because the request and the information describing aspects of the transaction can be provided to the server computer 118 in additional and/or alternative ways and/or orders, it should be understood that these examples are illustrative and therefore should not be construed as being limiting in any way.

According to various embodiments of the concepts and technologies described herein, the verification service 116 can function as a callable service. As such, it can be appreciated that the transmission of the request as shown in operation 308 can correspond to a service call by the web server 112. As such, the web server 112 can function, in some embodiments, as a calling device that calls the verification service 116. It should be understood that this example is illustrative and therefore should not be construed as being limiting in any way.

From operation 308, the method 300 proceeds to operation 310. At operation 310, the web server 112 can receive a response to the request transmitted in operation 308. Operation 310 can correspond to the web server 112 receiving the verification response 132 described above. Thus, the response received in operation 310 can include an indication as to whether the transaction is authenticated, authorized, legitimate, valid, unauthorized, fraudulent, illegitimate, invalid, or the like. The response received in operation 310 also can include instructions for the web server 112. In particular, the response can define how the web server 112 is to handle the transaction. For example, the response can indicate that the web server 112 is to terminate or block the transaction, allow the transaction, or the like.

From operation 310, the method 300 proceeds to operation 312. At operation 310, the web server 112 can enforce the verification response 132. In operation 312, the web server 112 can generate commands for enforcing the decision indicated in the response received in operation 310, or the web server 112 can take action or actions. In particular, the web server 112 can be configured to terminate the transaction or allow the transaction. The web server 112 also can be configured to instruct other devices, systems, nodes, software, or the like to terminate or allow the transaction.

The web server 112 also can be configured to inform the computing device 102 or other devices that the transaction has been blocked or allowed, if desired. In some embodiments, the future communications associated with the computing device 102 can be blocked or allowed based upon the decision received in operation 310, though this is not necessarily the case. Because other enforcement actions can be taken by the web server 112, it should be understood that these examples are illustrative and therefore should not be construed as being limiting in any way.

From operation 312, the method 300 proceeds to operation 314. The method 300 ends at operation 314.

Figure 4:
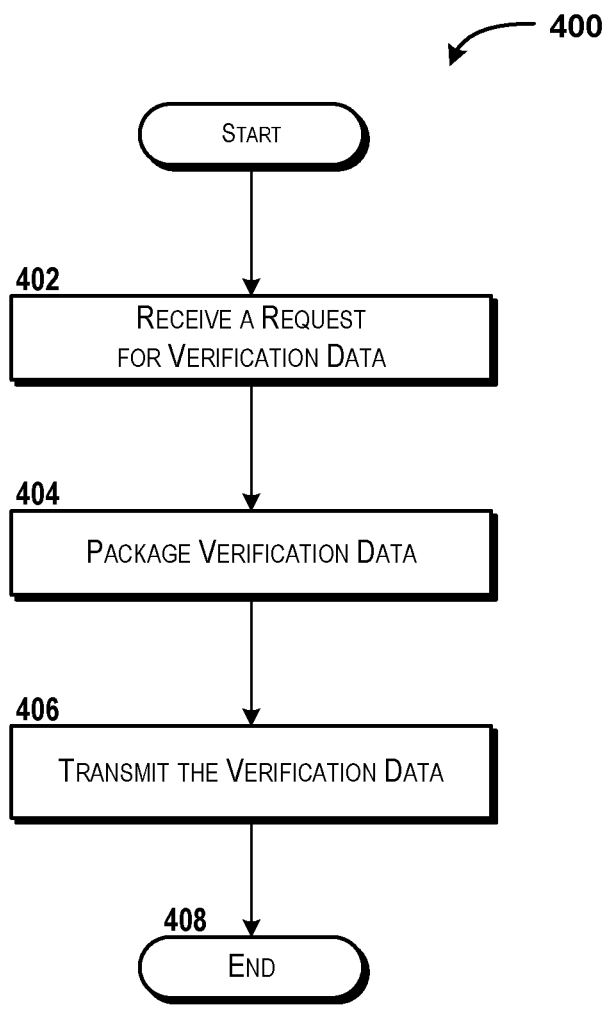
FIG. 4 is a flow diagram showing aspects of a method for providing verification data to a verification service via an out-of-band communication channel, according to an illustrative embodiment.

Turning now to FIG. 4, aspects of a method 400 for providing verification data to a verification service via an out-of-band communication channel 124 will be described in detail, according to an illustrative embodiment. The method 400 begins at operation 402. At operation 402, the out-of-band device 122 can receive a request for verification data 130. According to various embodiments of the concepts and technologies described herein, the request received in operation 402 can correspond to the verification data request 128. It should be understood that the request received in operation 402 can be transmitted via an out-band-communication channel such as the out-of-band communication channel 124 shown in FIG. 1.

According to various embodiments of the concepts and technologies described herein, the request received in operation 402 can define data or types of data that are being requested. Thus, the request received in operation 402 can specify, for example, what data is requested from the out-of-band device 122 so the out-of-band device 122 can obtain and provide the requested data. In some embodiments, for example, the request received in operation 402 can specify that battery state and/or usage data is requested; that display device state and/or usage data is requested; that input device state, usage, and/or history information is requested; that device orientation and/or location information is requested; that network adapter state and/or usage data is requested; combinations thereof; or the like. Because additional and/or alternative types of data can be obtained from the out-of-band device 122 as described above, the request received in operation 402 can specify other types of data. As such, the above examples are illustrative and should not be construed as being limiting in any way.

From operation 402, the method 400 proceeds to operation 404. At operation 404, the out-of-band device 122 can package the verification data 130 requested in operation 402. As used herein, the term "package" can refer to identifying, gathering or otherwise obtaining, and assembling the requested data into a data set that can be provided to the requestor as the verification data 130. Thus, operation 404 can correspond to reading state and/or usage information associated with various input and/or output devices; collecting data identifying keystrokes or other input detected at input devices; obtaining sensor readings; or the like. Operation 404 also can include assembling these and other data into a data set for providing to the requestor as the verification data 130. Because additional and/or alternative operations can be executed as part of operation 404, it should be understood that these examples are illustrative and therefore should not be construed as being limiting in any way.

From operation 404, the method 400 proceeds to operation 406. At operation 406, the out-of-band device 122 can transmit the verification data 130 packaged in operation 404 to the verification server 116. According to various embodiments, the out-of-band device 122 can transmit the verification data 130 to the server computer 118 via the out-of-band communication channel 124, though this is not necessarily the case. Thus, operation 406 can correspond to the out-of-band device 122 responding to the request received in operation 402. It should be understood that this example is illustrative and therefore should not be construed as being limiting in any way.

From operation 406, the method 400 proceeds to operation 408. The method 400 ends at operation 408.

Figure 5:
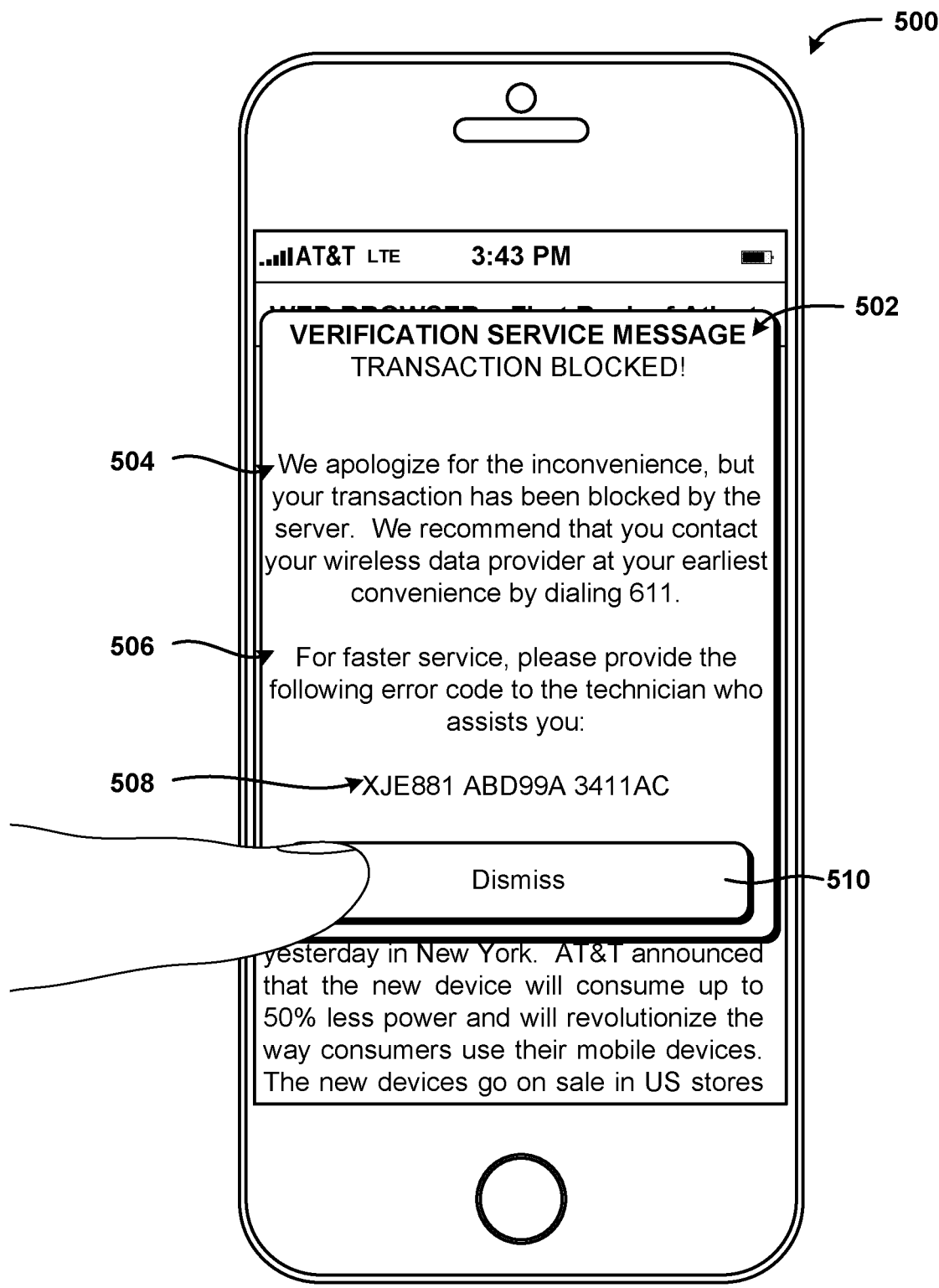
FIG. 5 is a user interface drawing showing aspects of the concepts and technologies described herein for providing out-of-band device verification of transactions, according to an illustrative embodiment.

FIG. 5 is a user interface ("UI") diagram showing aspects of a user interface ("UI") for informing a user that a transaction has been terminated or blocked in response to a verification service 116 decision, according to an illustrative embodiment of the concepts and technologies described herein. FIG. 5 shows an illustrative screen display 500 generated by a device such as the computing device 102. According to various embodiments, the computing device 102 can generate the screen display 500 and/or other screen displays based upon an alert or notification received from a web server 112, based upon an indication of a decision made by a verification service 116, and/or based upon other prompts or triggers as illustrated and described above. It should be appreciated that the UI diagram illustrated in FIG. 5 is illustrative of one contemplated example of a UI and therefore should not be construed as being limited in any way.

The screen display 500 can include various menus and/or menu options (not shown in FIG. 5). The screen display 500 also can include a verification service alert window 502. The verification service alert window 502 can be presented as an overlay on top of other user interface elements such as web page displays, application displays, device displays, or the like. The verification service alert window 502 can be presented to notify or inform a user or other entity associated with a particular transaction that the transaction has been blocked or terminated. The verification service alert window 502 also can provide additional information and/or instructions for addressing the blocking of the transaction and can be interacted with by a user or other entity to dismiss the alert, as will be explained in additional detail below.

In the embodiment of the screen display 500 shown in FIG. 5, the verification service alert window 502 includes a notification 504 that a transaction has been blocked or terminated. The notification 504 can explain that the transaction has been terminated or blocked, and provide instructions 506 for addressing the termination or blocking of the transaction. The instructions 506 can instruct the user or other entity viewing the verification service alert window 502 to call or otherwise contact an entity associated with the web server 112 or the verification service 116 to address the blocked transaction. In some embodiments, the instructions 506 can include a telephone number or short code that is to be dialed to reach a technician and/or an error code 508 that can be used to indicate why the transaction was blocked or terminated.

It can be appreciated that in some embodiments, the error code 508 may be encrypted and can indicate a particular aspect of the verification data 130 and/or the transaction data 114 that did not match. Thus, while the error code 508 may not be meaningful to the user or entity viewing the verification service alert window 502, the error code 508 may indicate to the technician what caused the termination of the transaction, which may be useful in determining if the transaction was fraudulent. It should be understood that this example is illustrative and therefore should not be construed as being limiting in any way.

As shown in the embodiment illustrated in FIG. 5, the verification service alert window 502 also can include a UI control 510 that, when selected, can cause the computing device 102 to hide the verification service alert window 502 and/or other UI elements. Thus, a user can select the UI control 510 to dismiss or exit the verification service alert window 502, if desired. Because additional and/or alternative UI elements can be included in the screen display 500 and/or the verification service alert window 502, it should be understood that the illustrated embodiment is illustrative and therefore should not be construed as being limited in any way. Furthermore, because a screen display can be generated to inform a user or other entity that a transaction has been allowed, it should be understood that this example is illustrative and therefore should not be construed as being limiting in any way.

Although the various embodiments of the concepts and technologies described herein have referenced an embodiment in which the verification service 116 performs verifications based upon requests such as the verification request 120, it should be understood that this is not necessarily the case. In particular, the verification service 116 described herein can perform the various functionality described herein for verifying transactions based upon discovering, based upon anomalies in data being submitted by the computing device 102 to various elements, based upon being prompted by other network elements or devices communicating with the computing device 102, or the like, with or without actually receiving a verification request 120 as illustrated in FIG. 1. Thus, it should be understood that the verification service 116 can detect an anomaly and therefore may initiate the verification process without having received any verification request 120. As such, the illustrated and described embodiments should be understood as being illustrative and should not be construed as being limiting in any way.

Figure 6:
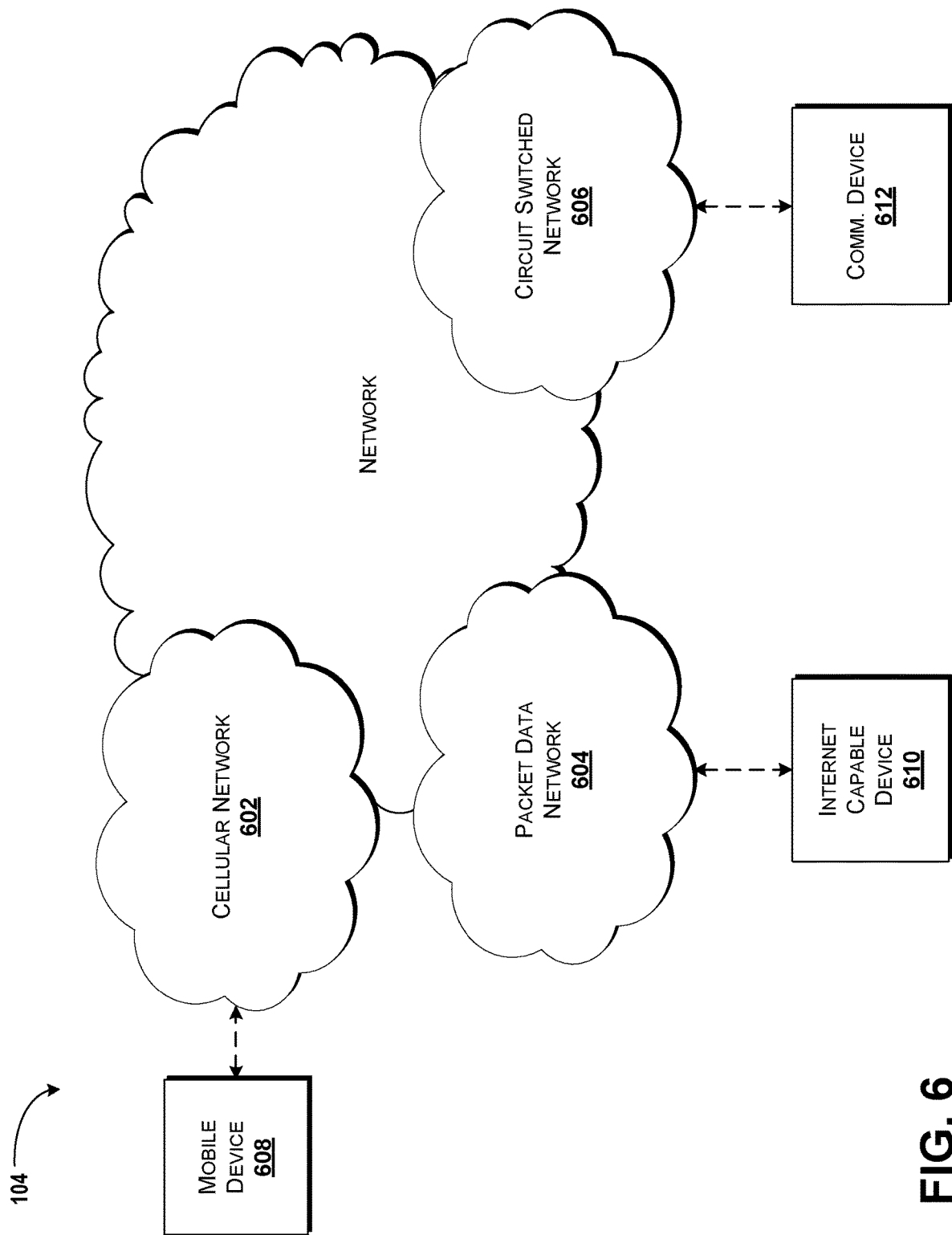
FIG. 6 schematically illustrates a network, according to an illustrative embodiment.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
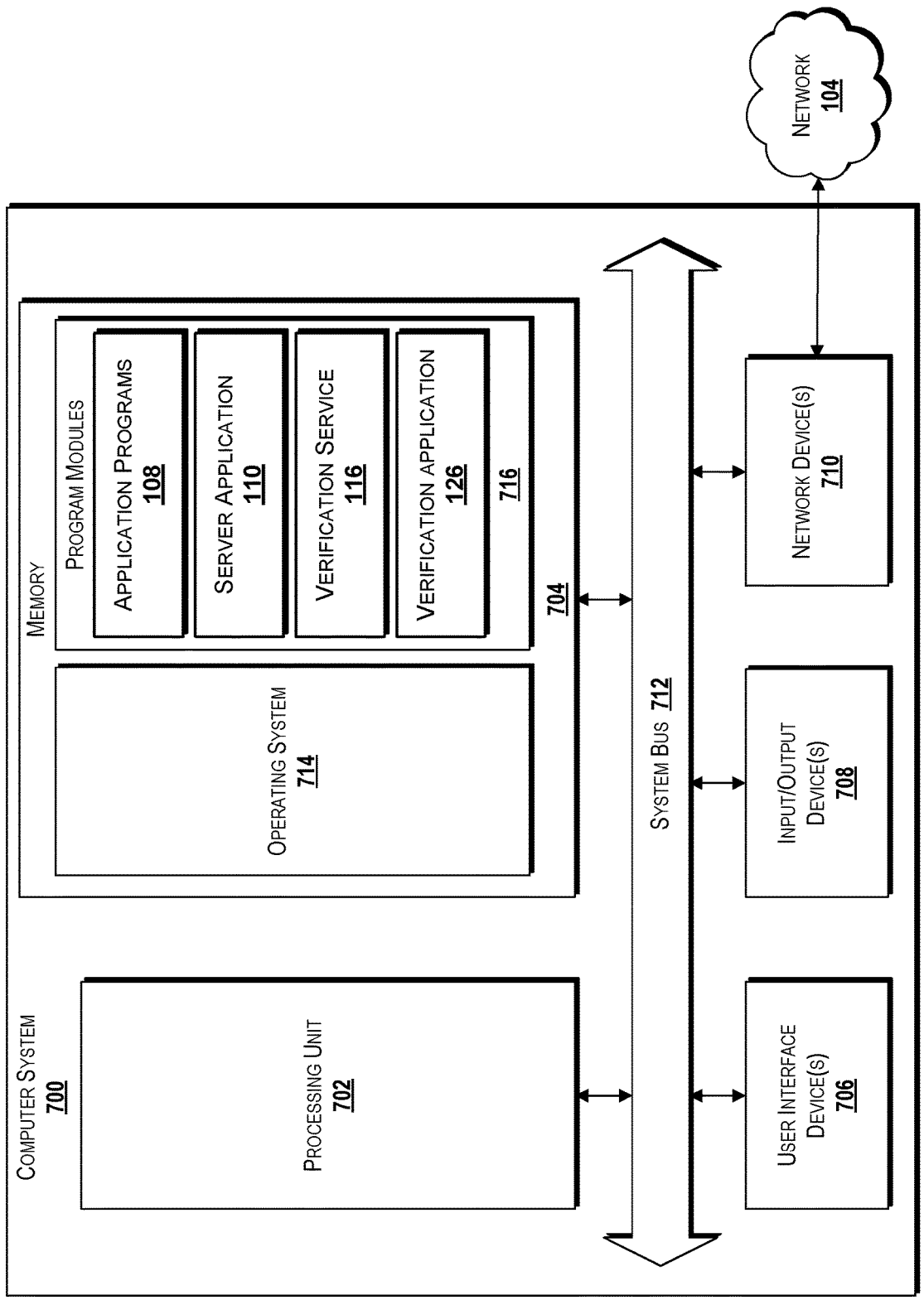
FIG. 7 is a block diagram illustrating an example computer system configured to provide out-of-band device verification of transactions, according to some illustrative embodiments.

FIG. 7 is a block diagram illustrating a computer system 700 configured to provide the functionality described herein for providing out-of-band device verification of transactions and/or interacting with a verification service 116 in accordance with various embodiments of the concepts and technologies disclosed herein. As such, the computer system 700 can correspond to an architecture for the computing device 102, the web server 112, the server computer 118, and/or the out-of-band device 122. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the application programs 108, the server application 110, the verification service 116, and/or the verification application 126. These and/or other programs can be embodied in computer-readable media containing instructions that, when executed by the processing unit 702, perform one or more of the methods 200, 300, and/or 400 described in detail above with respect to FIGS. 2-4. According to embodiments, the program modules 716 may be embodied in hardware, software, firmware, or any combination thereof. Although not shown in FIG. 7, it should be understood that the memory 704 also can be configured to store the transaction data 114, the verification request 120, the verification data request 128, the verification data 130, the verification response 132 and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
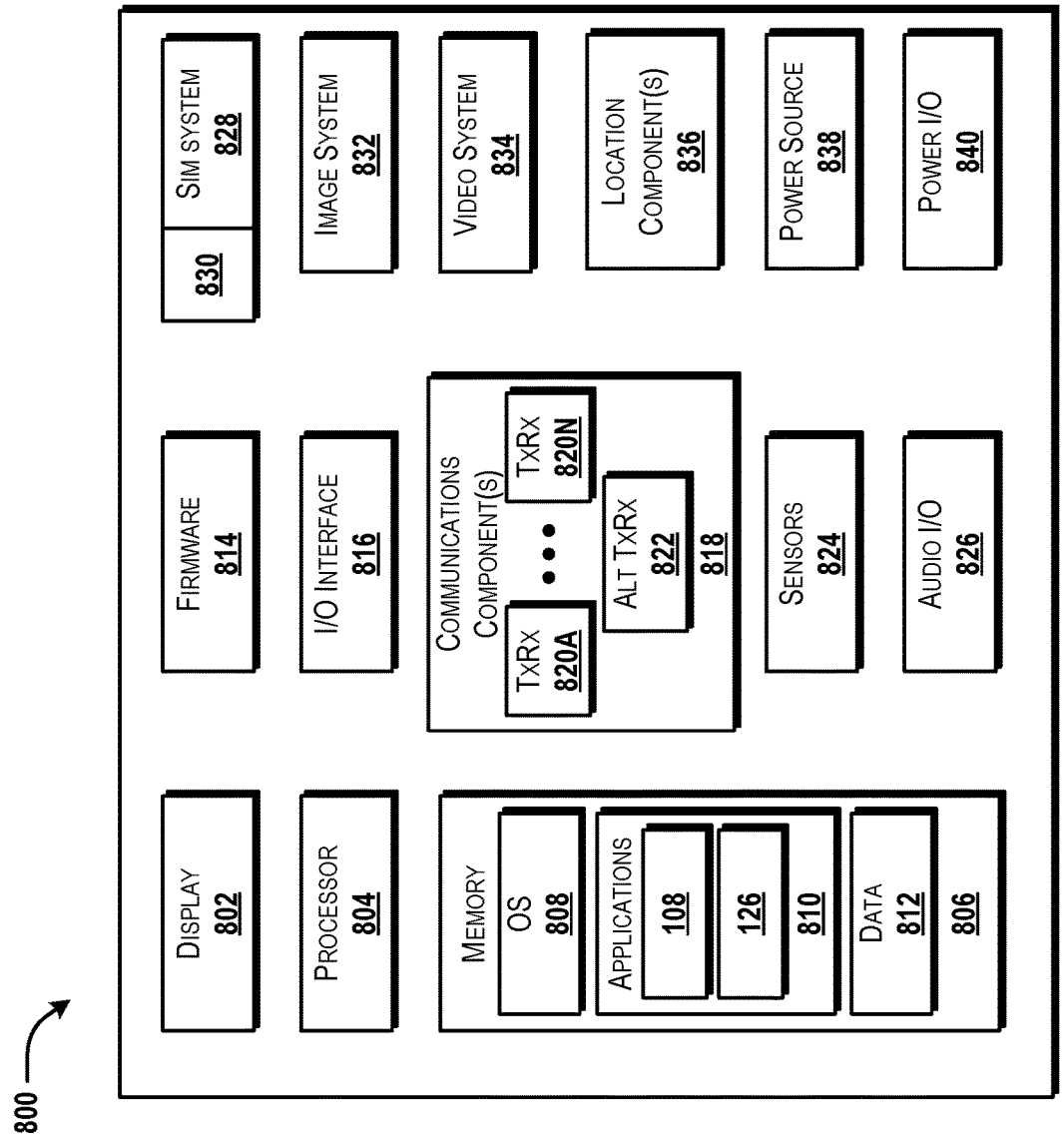
FIG. 8 is a block diagram illustrating an example mobile device configured to interact with a verification service, according to some illustrative embodiments.

Turning now to FIG. 8, an illustrative mobile device 800 and components thereof will be described. In some embodiments, the computing device 102 or one or more out-of-band device 122 described above with reference to FIGS. 1-7 can be configured as and/or can have an architecture similar or identical to the mobile device 800 described herein in FIG. 8. Furthermore, it can be appreciated that the out-of-band device 122 can include some of the components described with respect to the mobile device 800, even in some embodiments in which the out-of-band device 122 is not a mobile device.

It should be understood, however, that the computing device 102 and/or the out-of-band device 122 may or may not include the functionality described herein with reference to FIG. 8. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements to notify a user or other entity regarding a decision of the verification service 116, to provide user interfaces for accessing or executing a transaction, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the application programs 108 and/or the verification application 126, other computer-executable instructions stored in a memory 806, or the like. In some embodiments, the applications 810 also can include a UI application (not illustrated in FIG. 8).

The UI application can interface with the operating system 808, such as the operating system 106 shown in FIG. 1, to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, to execute or access a transaction, to view notifications associated with the verification service 116, to communicate with the web server 112, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, the transaction data 114, the verification request 120, the verification data request 128, the verification data 130, the verification response 132, applications or program modules, and/or other data.

According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, user or device identifiers, authenticate data, keystroke data, touch or multi-touch input data, output data, location data, user information, organization information, presence status information, user IDs, passwords, and application initiation (start-up) requests. In some embodiments, the I/O interface 816 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 800 can be configured to synchronize with another device to transfer content to and/or from the mobile device 800.

In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSDPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800.

In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Based on the foregoing, it should be appreciated that systems and methods for out-of-band device verification of transactions have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a first device comprising a processor; and
a memory that stores computer-executable instructions that, when executed by the processor, cause the processor to perform operations comprising:
receiving, at the first device via a first communication channel, a request to verify a transaction, wherein the request is received from a second device and includes transaction data that represents data received by the second device and from a third device during the transaction, and wherein the third device requests the transaction via the first communication channel,
identifying an out-of-band device that communicates with the third device during the transaction,
requesting, via a second communication channel between the first device and the out-of-band device, verification data from the out-of-band device, wherein the verification data represents data provided by the third device to the second device during the transaction, wherein the second communication channel is not used by the second device, and wherein the second communication channel is not used by the third device,
receiving, via the second communication channel, the verification data from the out-of-band device,
determining, based on the verification data and the transaction data, if the transaction is to be allowed, and
sending, directed to the second device and via the first communication channel, a verification response that is based on the determining.

2. The system of claim 1, wherein the computer-executable instructions, when executed by the processor, cause the processor to perform operations further comprising:
triggering blocking of the transaction in response to determining that the transaction is not to be allowed.

3. The system of claim 1, wherein determining if the transaction is to be allowed comprises comparing the verification data to the transaction data.

4. The system of claim 3, wherein the verification response indicates the transaction is to be allowed if the verification data matches the transaction data, and wherein the verification response indicates the transaction is not to be allowed if the verification data does not match the transaction data.

5. The system of claim 1, wherein the out-of-band device comprises a display of the third device, and wherein determining that the transaction is not to be allowed comprises determining, based on the verification data, that the display of the third device is not in use during the transaction.

6. The system of claim 1, wherein requesting the verification data comprises
generating, by the first device, a verification data request that requests the verification data from the out-of-band device; and
transmitting, by the first device, the verification data request to the out-of-band device via the second communication channel.

7. A method comprising:
receiving, at a first device and via a first communication channel, a request to verify a transaction, wherein the request is received from a second device and includes transaction data that represents data received by the second device and from a third device during the transaction, and wherein the third device requests the transaction via the first communication channel;
identifying, by the first device, an out-of-band device that communicates with the third device during the transaction;
requesting, by the first device and via a second communication channel between the first device and the out-of-band device, verification data from the out-of-band device, wherein the verification data represents data provided by the third device to the second device during the transaction, wherein the second communication channel is not used by the second device, and wherein the second communication channel is not used by the third device;

receiving, by the first device and via the second communication channel, the verification data from the out-of-band device;

determining, by the first device and based on the verification data and the transaction data, if the transaction is to be allowed; and sending, by the first device and directed to the second device via the first communication channel, a verification response that is based on the determining.

8. The method of claim 7, wherein determining if the transaction is to be allowed comprises comparing the verification data to the transaction data.

9. The method of claim 8, wherein the verification response indicates the transaction is to be allowed if the verification data matches the transaction data, and wherein the verification response indicates the transaction is not to be allowed if the verification data does not match the transaction data.

10. The method of claim 7, further comprising triggering blocking of the transaction in response to determining that the transaction is not to be allowed.

11. The method of claim 7, wherein the out-of-band device comprises a display of the third device, and wherein determining that the transaction is not to be allowed comprises determining, based on the verification data, that the display of the third device is not in use during the transaction.

12. The method of claim 7, wherein requesting the verification data comprises:

generating, by the first device, a verification data request that requests the verification data from the out-of-band device; and transmitting, by the first device, the verification data request to the out-of-band device via the second communication channel.

13. The method of claim 7, wherein the second device comprises a web server, wherein the out-of-band device comprises a component of the third device, and wherein the component is used during the transaction.

14. A computer storage medium having computer-executable instructions stored thereon that, when executed by a processor, cause the processor to perform operations comprising:

receiving, at a first device via a first communication channel, a request to verify a transaction, wherein the request is received from a second device and includes transaction data that represents data received by the second device and from a third device during the transaction, and wherein the third device requests the transaction via the first communication channel;

identifying an out-of-band device that communicates with the third device during the transaction;

requesting, via a second communication channel between the first device and the out-of-band device, verification data from the out-of-band device, wherein the verification data represents data provided by the third device to the second device during the transaction, wherein the second communication channel is not used by the second device, and wherein the second communication channel is not used by the third device;

receiving, via the second communication channel, the verification data from the out-of-band device;

determining, based on the verification data and the transaction data, if the transaction is to be allowed; and sending, directed to the second device and via the first communication channel, a verification response that is based on the determining.

15. The computer storage medium of claim 14, wherein the computer-executable instructions, when executed by the processor, cause the processor to perform operations further comprising:

triggering blocking of the transaction in response to determining that the transaction is not to be allowed.

16. The computer storage medium of claim 14, wherein determining if the transaction is to be allowed comprises comparing the verification data to the transaction data.

17. The computer storage medium of claim 16, wherein the verification response indicates the transaction is to be allowed if the verification data matches the transaction data, and wherein the verification response indicates the transaction is not to be allowed if the verification data does not match the transaction data.

18. The computer storage medium of claim 14, wherein the out-of-band device comprises a display of the third device, and wherein determining that the transaction is not to be allowed comprises determining, based on the verification data, that the display of the third device is not in use during the transaction.

19. The computer storage medium of claim 14, wherein requesting the verification data comprises generating, by the first device, a verification data request that requests the verification data from the out-of-band device; and transmitting, by the first device, the verification data request to the out-of-band device via the second communication channel.

20. The computer storage medium of claim 14, wherein the second device comprises a web server, and wherein in response to determining that the transaction is not to be allowed, the web server is instructed to terminate the transaction.

* * * * *